United States Patent
Lin (10) Patent No.: US 9,390,044 B2
(45) Date of Patent: Jul. 12, 2016

(54) CONVERTER MEMBER AND CONVERTER APPARATUS

(71) Applicant: HON HAI PRECISION INDUSTRY CO., LTD., New Taipei (TW)

(72) Inventor: Ching-Chung Lin, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 15 days.

(21) Appl. No.: 14/445,260

(22) Filed: Jul. 29, 2014

(65) Prior Publication Data

US 2015/0032916 A1      Jan. 29, 2015

(30) Foreign Application Priority Data

Jul. 29, 2013   (CN) .......................... 2013 1 0321708

(51) Int. Cl.
| | |
|---|---|
| G06F 3/00 | (2006.01) |
| G06F 13/12 | (2006.01) |
| G06F 13/38 | (2006.01) |
| G06F 13/00 | (2006.01) |
| G06F 3/06 | (2006.01) |
| G06F 3/12 | (2006.01) |
| G06F 11/30 | (2006.01) |

(52) U.S. Cl.
CPC ............ *G06F 13/385* (2013.01); *G06F 3/0661* (2013.01); *G06F 3/1206* (2013.01); *G06F 11/3068* (2013.01)

(58) Field of Classification Search
CPC .. G06F 3/0661; G06F 3/1206; G06F 11/3068
USPC ................................. 710/30, 65, 69, 70, 100
See application file for complete search history.

(56) References Cited

U.S. PATENT DOCUMENTS

| | | | | |
|---|---|---|---|---|
| 2007/0233906 | A1* | 10/2007 | Tatum et al. ..................... | 710/26 |
| 2010/0268860 | A1* | 10/2010 | Nikazm et al. ................ | 710/105 |
| 2011/0145451 | A1* | 6/2011 | Soffer et al. .................... | 710/64 |
| 2012/0084479 | A1* | 4/2012 | Hale et al. ..................... | 710/301 |

* cited by examiner

*Primary Examiner* — Idriss N Alrobaye
*Assistant Examiner* — Getente A Yimer
(74) *Attorney, Agent, or Firm* — ScienBiziP, P.C.

(57) ABSTRACT

A converter member connects between an electronic device and a load media for transmitting data. The converter member includes a first plug and a second plug electrically connected with the first plug. The first plug is detachably connected to the electronic device, and the second plug is detachably connected to the load media. The first plug and the second plug are two different type plugs. The data from the load media is transmitted to the electronic device through the second plug and the first plug orderly.

16 Claims, 6 Drawing Sheets

CONVERTER MEMBER AND CONVERTER APPARATUS

CROSS-REFERENCE TO RELATED APPLICATIONS

This application claims priority to Chinese Patent Application No. 201310321708.2 filed on Jul. 29, 2013 in the China Intellectual Property Office, the contents of which are incorporated by reference herein.

FIELD

The present disclosure relates to converter members.

BACKGROUND

Converter includes a first plug, a format converting module, and a second plug. The first plug and the second plug are used for transmitting signal in different formats.

BRIEF DESCRIPTION OF THE FIGURES

Implementations of the present technology will now be described, by way of example only, with reference to the attached figures.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

In the present disclosure, "module," refers to logic embodied in hardware or firmware, or to a collection of software instructions, written in a program language. In one embodiment, the program language can be Java, C, or assembly. One or more software instructions in the modules can be embedded in firmware, such as in an erasable programmable read only memory (EPROM). The modules described herein can be implemented as either software and/or hardware modules and can be stored in any type of non-transitory computer-readable media or storage medium. Non-limiting examples of a non-transitory computer-readable medium include CDs, DVDs, flash memory, and hard disk drives.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "outside" refers to a region that is beyond the outermost confines of a physical object. The term "inside" indicates that at least a portion of a region is partially contained within a boundary formed by the object. The term "substantially" is defined to be essentially conforming to the particular dimension, shape, or other feature that the term modifies, such that the component need not be exact. For example, "substantially cylindrical" means that the object resembles a cylinder, but can have one or more deviations from a true cylinder. The term "comprising" means "including, but not necessarily limited to"; it specifically indicates open-ended inclusion or membership in a so-described combination, group, series and the like.

A converter member capable of transmitting signals from the second plug to the first plug directly is described.

Figure 1:
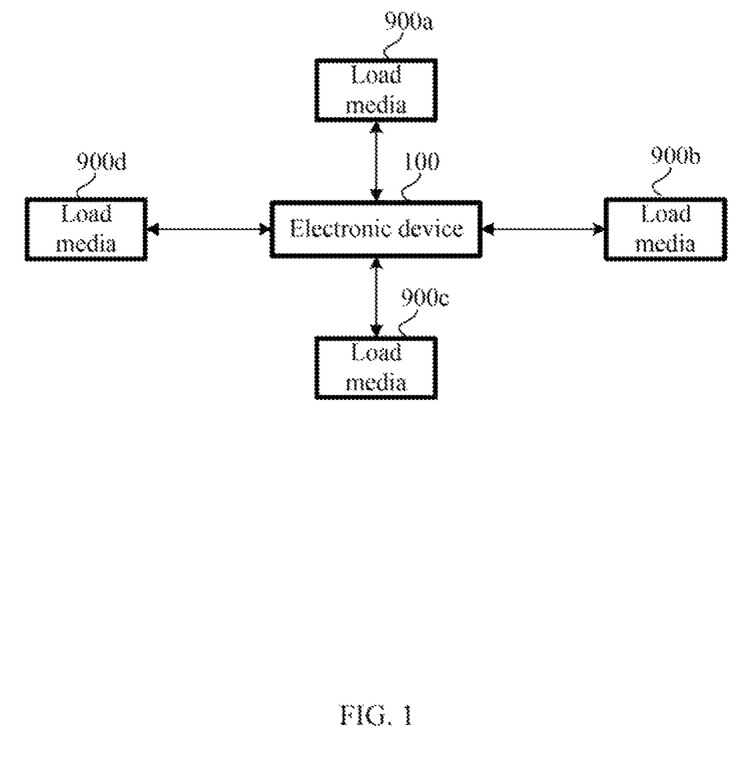
FIG. 1 is a block diagram of an embodiment of an electronic device connected to a plurality of load medias.

FIG. 1 illustrates an embodiment of an electronic device 100 coupled to a plurality of load medias 900a-900n through a plurality of converter member 80-80n. In at least one embodiment, the electronic device 100 is a television, and there are four load medias 900a-900d. The electronic device 100 can connects wirelessly with any or all of the load medias 900a-900d. In other embodiments, the electronic device 100 connects via wires with the load medias 900a-900d.

The electronic device 100 is capable of switching between a first working mode and a second working mode. In the second working mode, the electronic device 100 displays signals from at least two of the load medias 900a-900n randomly.

Figure 2:
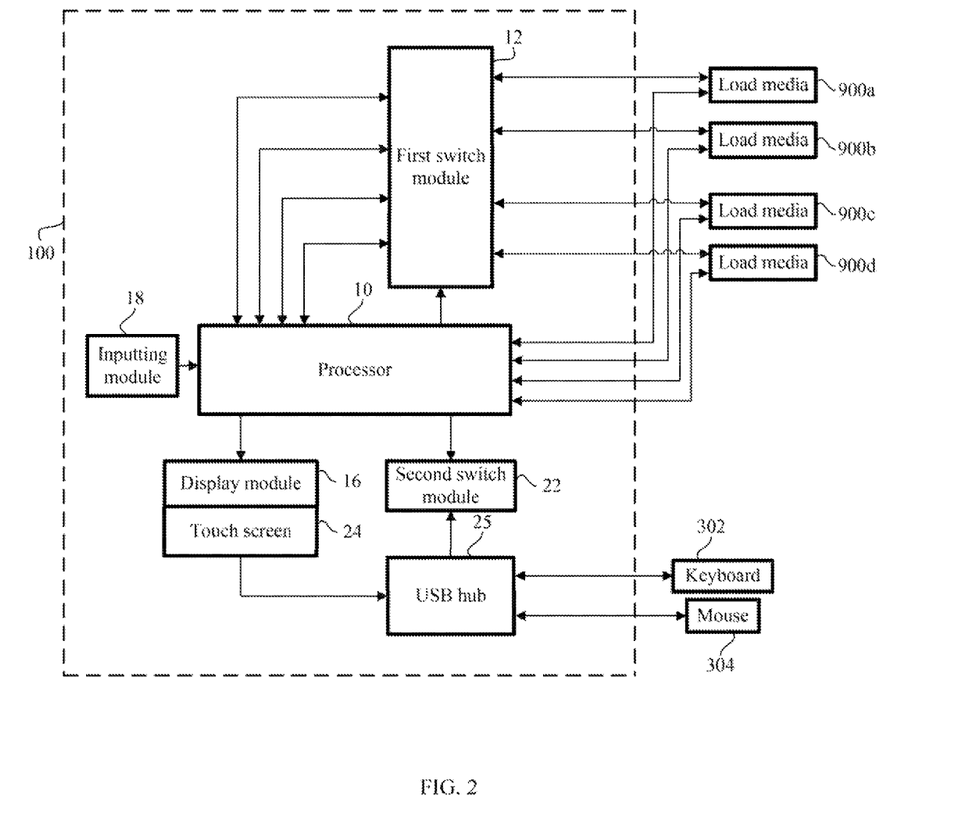
FIG. 2 is a block diagram of another embodiment of the electronic device of FIG. 1, the electronic device comprising a processor, a first switch module, and a second switch module.

FIG. 2 illustrates that the electronic device 100 includes a processor 10, a first switch module 12, a second switch module 14, a display module 16, a touch screen 17, an inputting module 18, and an Universal Serial Bus (USB) hub 19. The electronic device 100 further connects to a keyboard 302 and a mouse 304.

The processor 10 connects to the load medias 900a-900n, the first switch module 12, the second switch module 14, the display module 16, and the inputting module 18. The processor 10 is capable of switching between the first working mode and the second working mode. In at least one embodiment, a predetermined key (not shown) of the inputting module 18 is pressed to switch between the first working mode and the second working mode. In the first working mode, one of the load medias 900a-900n is selected by user, and the processor 10 generates a first control signal. In the second working mode, at least two of the load medias 900a-900n are selected by user, and the processor 10 generates a second control signal.

The first switch module 12 makes connections and breaks connections between the load medias 900a-900n and the processor 10. The first switch module 12 turns on to establish an electrical connection between the selected load media of the load medias 900a-900n and the processor 10, in response to the first control signal. Thus the processor 10 processes signals from the selected load media, such as changing formats or encoding/decoding. The first switch module 12 turns on to establish independent electrical connections between the selected load medias and the processor 10, in response to the second control signal. Thus the electronic device 100 can simultaneously signals from the selected load medias.

The processor 10 further generates a connecting signal.

The second switch module 14 connects to the processor 10, the USB hub 19, and the load medias 900a-900n. The second switch module 14 turns on to establish an electrical connection between the selected load media(s) and the USB hub 19, in response to the connecting signal. Thus the keyboard 302 and the mouse 304 can controls the selected load media(s).

The display module 16 connects with the processor 10. The display module 16 displays the processed signals from the processor 10 which is obtained from the selected load media(s). In at least embodiment, the signals are displayed in a picture-in-picture manner or in different windows parallel with each other.

The inputting module 18 connects with the processor 10. The inputting module 18 selects at least one of the load medias 900a-900n. In at least one embodiment, the inputting module 18 can be a virtual keyboard on the display module 16 or buttons presented on the electronic device 100.

Figure 3:
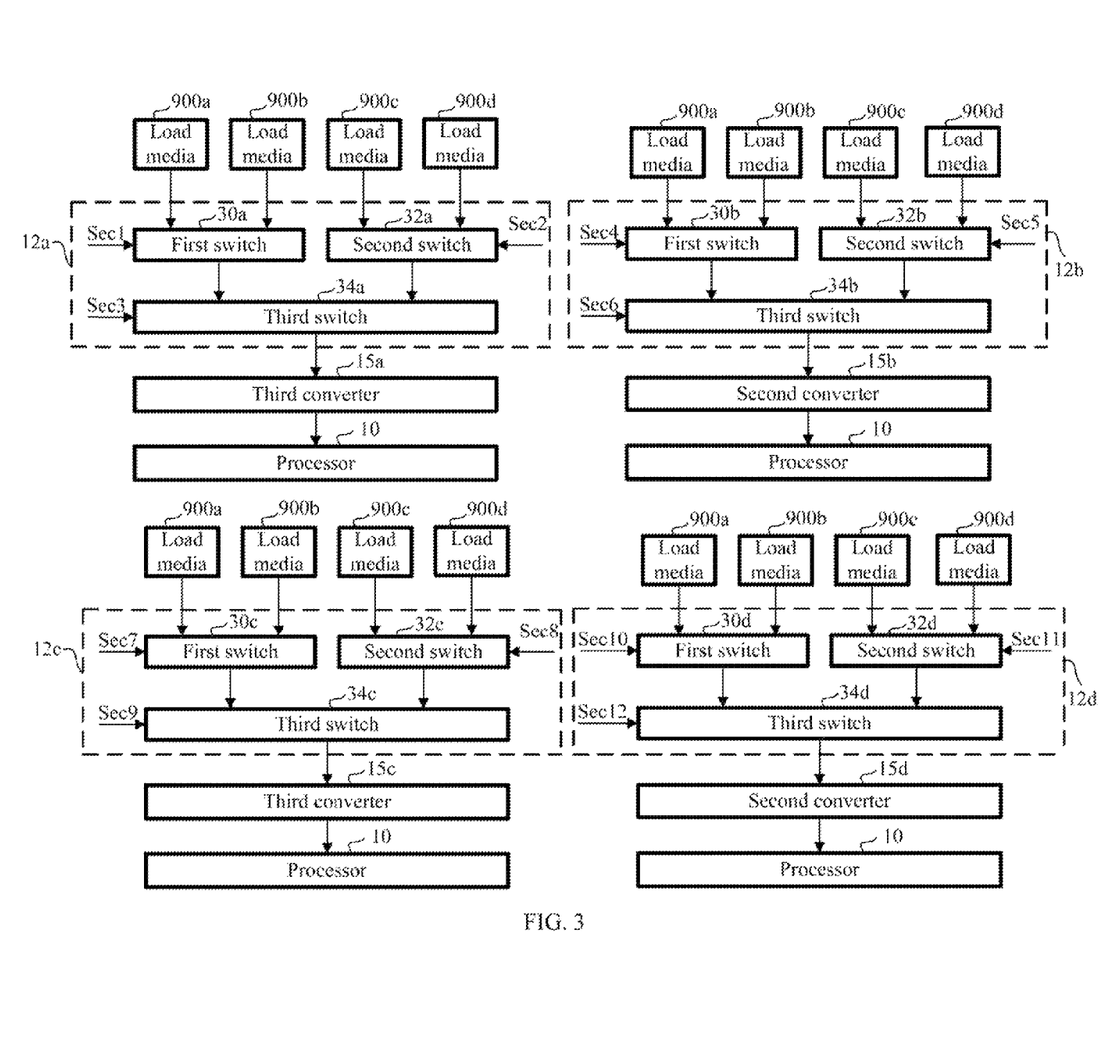
FIG. 3 is a block diagram of an embodiment of the first switch module of FIG. 2.

FIG. 3 illustrates that the first switch module 12 includes a first switch unit 12a, a second switch unit 12b, a third switch unit 12c, and a fourth switch unit 12d when there are four load medias 900a-900d. Each of the first switch unit 12a, the second switch unit 12b, the third switch unit 12c, and the fourth switch unit 12d includes first switches 30a-30d, second switches 32a-32d, and three switches 34a-34d. Each of the first switches 30a-30d, second switch 32a-32d, and three switch 34a-34d includes a first inputting terminal, a second inputting terminal, and an outputting terminal. The first and second inputting terminals of the first switch 30a are connected to the load media 900a-900b respectively. The outputting terminal of the first switch 30a is connected to the first inputting terminal of the third switch 34a. The first and second inputting terminals of the second switch 32a are connected to the load medias 900c-900d respectively. The outputting terminal of the second switch 32a is connected to the second inputting terminal of the third switch 34a. The outputting terminal of the third switch 34a is connected to the processor 10.

The first and second inputting terminals of the first switch 30b are connected to the load media 900a-900b respectively. The outputting terminal of the first switch 30b is connected to the first inputting terminal of the third switch 34b. The first and second inputting terminals of the second switch 32b are connected to the load medias 900c-900d respectively. The outputting terminal of the second switch 32b is connected to the second inputting terminal of the third switch 34b. The outputting terminal of the third switch 34b is connected to the processor 10.

The first and second inputting terminals of the first switch 30c are connected to the load media 900a-900b respectively. The outputting terminal of the first switch 30c is connected to the first inputting terminal of the third switch 34c. The first and second inputting terminals of the second switch 32c are connected to the load medias 900c-900d respectively. The outputting terminal of the second switch 32c is connected to the second inputting terminal of the third switch 34c. The outputting terminal of the third switch 34c is connected to the processor 10.

The first and second inputting terminals of the first switch 30d are connected to the load medias 900a-900b respectively. The outputting terminal of the first switch 30d is connected to the first inputting terminal of the third switch 34d. The first and second inputting terminals of the second switch 32d are connected to the load medias 900c-900d respectively. The outputting terminal of the second switch 32d is connected to the second inputting terminal of the third switch 34d. The outputting terminal of the third switch 34d is connected to the processor 10.

Figure 4:
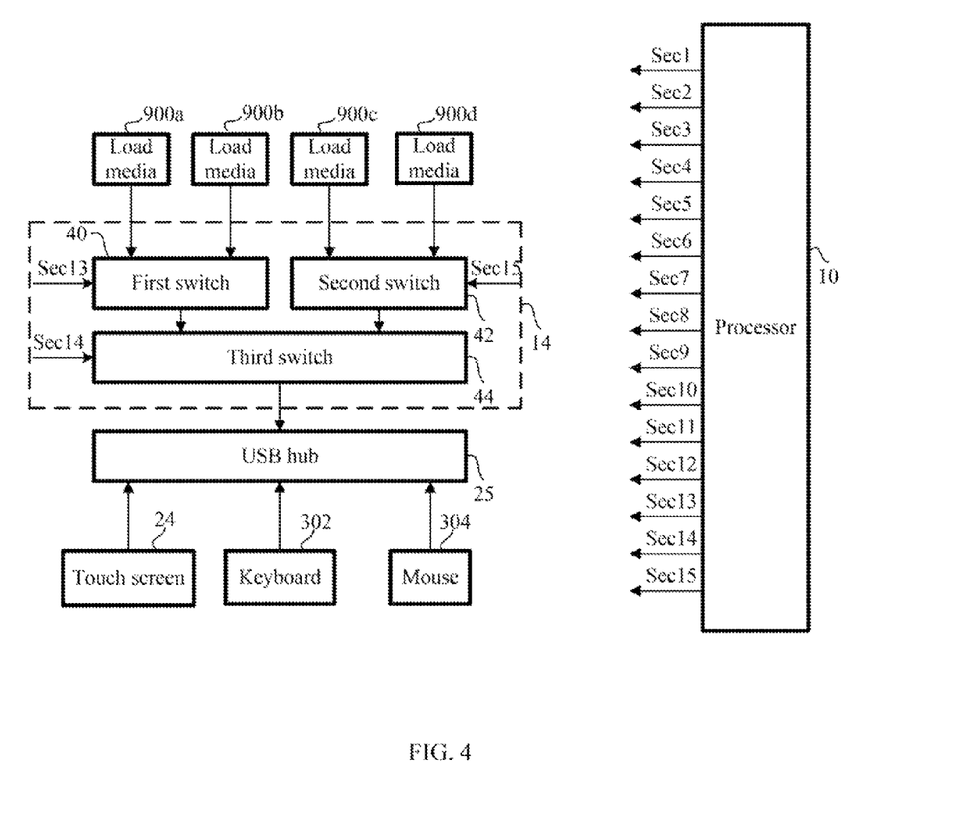
FIG. 4 is a block diagram of an embodiment of the second switch module of FIG. 2.

FIG. 4 illustrates that the second switch module 14 includes a first switch 40, a second switch 42, and a third switch 44. Each of the first switch 40, the second switch 42, and the three switch 44 includes a first inputting terminal, a second inputting terminal, and an outputting terminal. The first and second inputting terminals of the first switch 40 are connected to the load medias 900a-900b respectively. The outputting terminal of the first switch 40 is connected to the first inputting terminal of the third switch 44. The first and second inputting terminals of the second switch 42 are connected to the load medias 900c-900d respectively. The outputting terminal of the second switch 42 is connected to the second inputting terminal of the third switch 44. The outputting terminal of the third switch 44 is connected to the processor 10.

Figure 5:
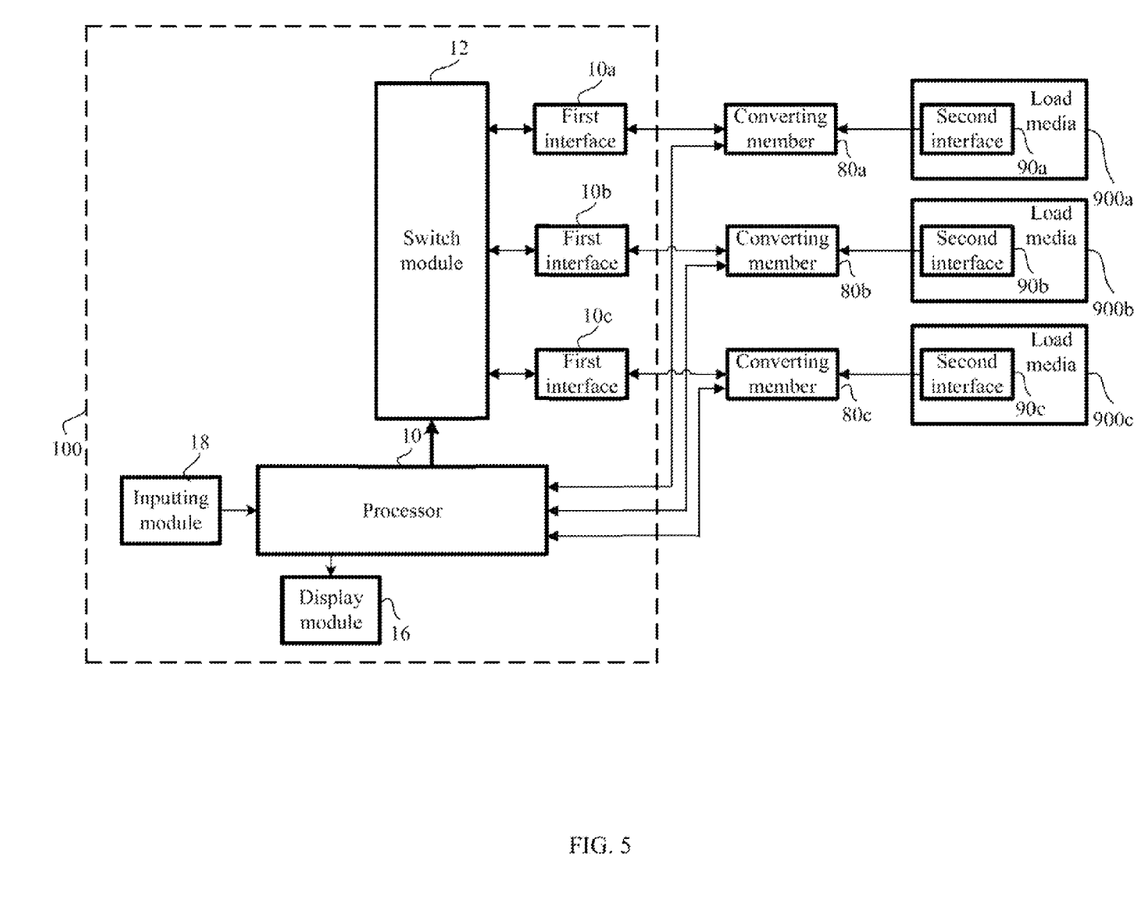
FIG. 5 is a block diagram of an embodiment of converting members connected between the electronic device and the load medias.

FIG. 5 illustrates that electronic device 100 further comprises a plurality of first interfaces 10a-10n and a plurality of converters 15a-15n. Each of the converters 15a-15n connects between the first switch module 12 and the corresponding load media of the load medias 900a-900n. The load medias 900a-900n include a second interfaces 90a-90n respectively for transmitting signals. Each of the converters 15a-15n presets a specified data format corresponding to the connected load media. In at least one embodiment, the first interfaces 10a-10n are display port, and the second interfaces 90a-90d are a High Definition Multimedia Interface (HDMI) interface, a USB interface, a digital visual interface (DVI) interface, and a Local Area Network (LAN) interface. In at least one embodiment, one of the second interfaces 90a-90n is a High Definition Multimedia Interface (HDMI) interface, one of the second interfaces 90a-90n is a USB interface, one of the second interfaces 90a-90n is a digital visual interface (DVI) interface, one of the second interfaces 90a-90n is a Local Area Network (LAN) interface.

Figure 6:
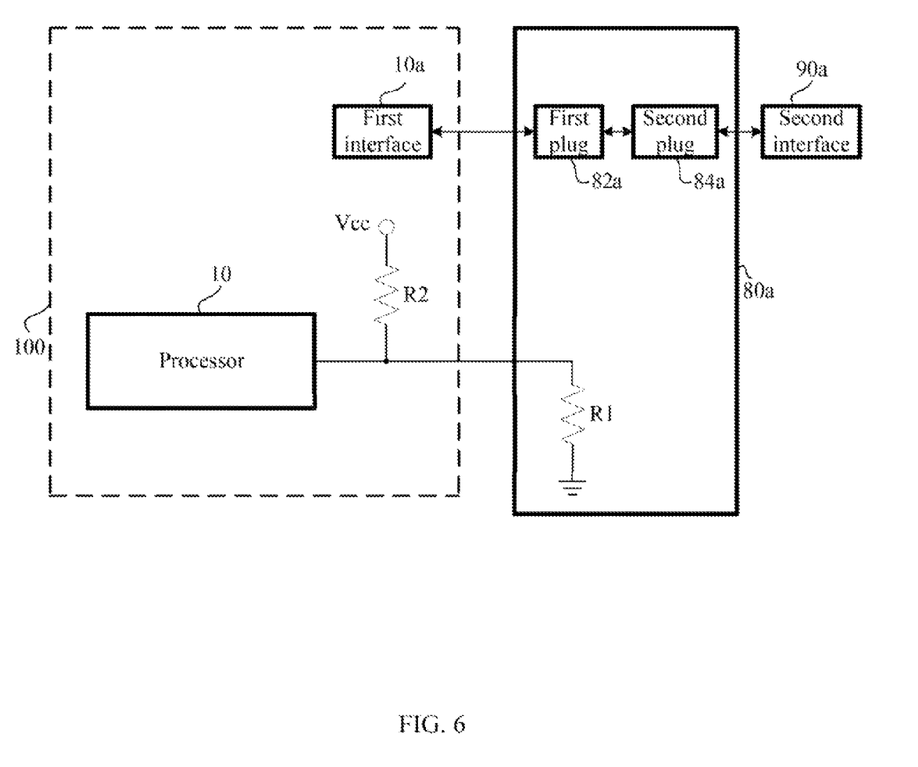
FIG. 6 is a block diagram of an embodiment of the converting member of FIG. 2.

FIG. 6 illustrates that the electronic device 100 further includes a power supply Vcc and a first resistor R1. The converter member 80a for storing a specified format code includes a first plug 82a, a second plug 84a, and a second resistor R2. The power supply Vcc is connected to the processor 10 through the first resistor R1. The first plug 82a detachably connects to the first interface 10a, and the second plug 84a detachably connects to the load media 900a. An end of the first resistor R2 is connected to the end of the first resistor R1, and the other end of the resistor R2 is grounded. The construction of the converter members 80b-80c is similar to the construction of the converter member 80a. In at least embodiment, the resistances of the second resistor R2 in the converter member 80a-80n are different with each other.

In at least one embodiment, the first plug 82a of the converter member 80a is a DP type plug, and the second plug 84a of the converter member 80a is an HDMI type plug. Table 1-1 below shows the relationship between the pins of the first interface 10a and the pins of the first and second plugs 82a and 84a.

As the table 1-1 shows, the first plug 82a includes an ML_Lane0 positive pin, a first grounded pin, an ML_Lane0 negative pin, an ML_Lane1 positive pin, a second grounded pin, an ML_Lane1 negative pin, an ML_Lane2 positive pin, a third grounded pin, an ML_Lane2 negative pin, an ML_Lane3 positive pin, a fourth grounded pin, an ML_Lane3 negative pin, a config1 pin, a config2 pin, an AUX CH positive pin, a fifth grounded pin, an AUX CH negative pin, a hot-plug detect pin, a return pin, and a DP PWR pin. The second plug 84a of the converter member 80a includes a TMDS2+ pin, a first ground pin, a TMDS2− pin, a TMDS1+ pin, a second ground pin, a TMDS1− pin, a TMDS0+, a third ground pin, a TMDS0− pin, a HRXCP pin, a fourth ground pin, a HRXCN pin, a CEC pin, a DDC/CEC pin, a SCL pin, a NC pin, a SDA pin, a hot plug detect pin, and a HDMI PWR pin. The TMDS2+ pin connects with the ML_Lane0 positive pin. The first ground pin connects with the first grounded pin. The TMDS2− pin connects with the ML_Lane0 negative pin. The TMDS1+ pin connects with the ML_Lane1 positive pin. The second ground pin connects with the second grounded pin. The TMDS1− pin connects with the ML_Lane0 negative pin. The TMDS0+ pin connects with the ML_Lane2 positive pin. The third ground pin connects with the third grounded pin. The TMDS0− pin connects with the ML_Lane2 negative pin. The HRXCN pin connects with the ML_Lane3 positive pin. The fourth ground pin connects with the fourth grounded pin. The HRXCP pin connects with the ML_Lane3 negative pin. The CEC pin connects with the config1 pin. The DDC/CEC pin connects with the config2 pin. The SCL pin connects with the AUX CH(p) pin. The NC pin connects with the fifth grounded pin. The SDA pin connects with the AUX CH(n) pin. The HDMI PWR pin connects the DP PWR pin.

The first plug 82b of the converter member 80b is a DP type plug, and the second plug 84b of the converter member 80b is a USB type plug. Table 1-2 below shows the relationship between the pins of the first interface 10b and the pins of the first and second plugs 82b and 84b.

TABLE 1-1

| | First interface | | | First plug | | | Second plug |
|---|---|---|---|---|---|---|---|
| PIN | Display_Port1.2 | | PIN | Display_Port1.2 | | PIN | HDMI |
| 1 | ML_Lane3(n) | | 1 | ML_Lane0(p) | ↔ | 1 | TMDS2+ |
| 2 | GND | | 2 | GND | ↔ | 2 | GND |
| 3 | ML_Lane3(p) | | 3 | ML_Lane0(n) | ↔ | 3 | TMDS2− |
| 4 | ML_Lane2(n) | | 4 | ML_Lane1(p) | ↔ | 4 | GND |
| 5 | GND | | 5 | GND | ↔ | 5 | TMDS1+ |
| 6 | ML_Lane2(p) | | 6 | ML_Lane1(n) | ↔ | 6 | GND |
| 7 | ML_Lane1(n) | | 7 | ML_Lane2(p) | ↔ | 7 | TMDS1− |
| 8 | GND | | 8 | GND | ↔ | 8 | TMDS0+ |
| 9 | ML_Lane1(p) | | 9 | ML_Lane2(n) | ↔ | 9 | GND |
| 10 | ML_Lane0(n) | | 10 | ML_Lane3(p) | ↔ | 10 | TMDS0− |
| 11 | GND | | 11 | GND | ↔ | 11 | HRXCP |
| 12 | ML_Lane0(p) | | 12 | ML_Lane3(n) | ↔ | 12 | GND |
| 13 | CONFIG1 | ↔ | 13 | CONFIG1 | ↔ | 13 | HRXCN |
| 14 | CONFIG2 | ↔ | 14 | CONFIG2 | ↔ | 17 | CEC |
| 15 | AUX CH(p) | ↔ | 15 | AUX CH(p) | ↔ | 15 | DDC/CEC |
| 16 | GND | ↔ | 16 | GND | ↔ | 14 | SCL |
| 17 | AUX CH(n) | ↔ | 17 | AUX CH(n) | ↔ | 16 | NC |
| 18 | Hot plug Detect | ↔ | 18 | Hot plug Detect | ↔ | 19 | SDA |
| 19 | Return | ↔ | 19 | Return | | | HOT Plug Dect |
| 20 | DP PWR | ↔ | 20 | DP PWR | ↔ | 18 | HDMI-PWR |

TABLE 1-2

| First interface | | | First plug | | Second plug |
|---|---|---|---|---|---|
| PIN | Display_Port1.2 | PIN | Display_Port1.2 | PIN | USB3.0 |
| 1 | ML_Lane3(n) | 1 | ML_Lane0(p) | 3 | D+ |
| 2 | GND | 2 | GND | 4 | GND |
| 3 | ML_Lane3(p) | 3 | ML_Lane0(n) | 2 | D- |
| 4 | ML_Lane2(n) | 4 | ML_Lane1(p) | 6 | STDA_SSTX+ |
| 5 | GND | 5 | GND | 7 | GND-DRAIN |
| 6 | ML_Lane2(p) | 6 | ML_Lane1(n) | 5 | STDA_SSTX- |
| 7 | ML_Lane1(n) | 7 | ML_Lane2(p) | 9 | STDA_SSTX+ |
| 8 | GND | 8 | GND | | |
| 9 | ML_Lane1(p) | 9 | ML_Lane2(n) | 8 | STDA_SSTX- |
| 10 | ML_Lane0(n) | 10 | ML_Lane3(p) | | |
| 11 | GND | 11 | GND | | |
| 12 | ML_Lane0(p) | 12 | ML_Lane3(n) | | |
| 13 | CONFIG1 | 13 | CONFIG1 | | |
| 14 | CONFIG2 | 14 | CONFIG2 | | |
| 15 | AUX CH(p) | 15 | AUX CH(p) | | |
| 16 | GND | 16 | GND | | |
| 17 | AUX CH(n) | 17 | AUX CH(n) | | |
| 18 | Hot plug Detect | 18 | Hot plug Detect | | |
| 19 | Return | 19 | Return | | |
| 20 | DP PWR | 20 | DP PWR | 1 | VUBS |

As the table 1-2 shows, the first plug 82b includes an ML_Lane0 positive pin, a first grounded pin, an ML_Lane0 negative pin, an ML_Lane1 positive pin, a second grounded pin, an ML_Lane1 negative pin, an ML_Lane2 positive pin, a third grounded pin, an ML_Lane2 negative pin, an ML_Lane3 positive pin, a fourth grounded pin, an ML_Lane3 negative pin, a config1 pin, a config2 pin, an AUX CH positive pin, a fifth grounded pin, an AUX CH negative pin, a hot-plug detect pin, a return pin, and a DP PWR pin. The second plug 84b of the converter member 80b includes a D- pin, a D+ pin, a GND pin, an STDA_SSRX- pin, an STDA_SSRX+ pin, a GND_DRAIN pin, an STDA_SSTX- pin, an STDA_SSRX+ pin, and a VBUS pin. The D+ pin connects with the ML_Lane0 positive pin. The GND pin connects with the first grounded pin. The D- pin connects with the first ML_Lane0 negative pin. The STDA_SSRX+ pin connects with the ML_Lane1 positive pin. The GND_DRAIN pin connects with the second grounded pin. The STDA_SSRX- pin connects with the ML_Lane2 negative pin. The VP Cable power 1 pin connects with the DP PWR pin. The VBUS pin connects to the DP PWR.

The first plug 82c of the converter member 80c is a DP type plug, and the second plug of the converter member 80c is a DVI type plug. Table 1-3 below shows the relationship between the pins of the first interface 10c and the pins of the first and second plugs 82c and 84c.

TABLE 1-3

| First interface | | | First plug | | Second plug |
|---|---|---|---|---|---|
| PIN | Display_Port1.2 | PIN | Display_Port1.2 | PIN | DVI |
| 1 | ML_Lane3(n) | 1 | ML_Lane0(p) | 2 | TMDS2+ |
| 2 | GND | 2 | GND | 3 | GND |
| 3 | ML_Lane3(p) | 3 | ML_Lane0(n) | 1 | TMDS2- |
| 4 | ML_Lane2(n) | 4 | ML_Lane1(p) | 10 | TMDS1+ |
| 5 | GND | 5 | GND | 11 | GND |
| 6 | ML_Lane2(p) | 6 | ML_Lane1(n) | 9 | TMDS1- |
| 7 | ML_Lane1(n) | 7 | ML_Lane2(p) | 18 | TMDS0+ |
| 8 | GND | 8 | GND | 19 | GND |
| 9 | ML_Lane1(p) | 9 | ML_Lane2(n) | 17 | TMDS0- |
| 10 | ML_Lane0(n) | 10 | ML_Lane3(p) | 23 | TMDS clock+ |
| 11 | GND | 11 | GND | 15 | GND |
| 12 | ML_Lane0(p) | 12 | ML_Lane3(n) | 24 | TMDS clock- |
| 13 | CONFIG1 | 13 | CONFIG1 | | |
| 14 | CONFIG2 | 14 | CONFIG2 | | |
| 15 | AUX CH(p) | 15 | AUX CH(p) | 6 | DDC clock |
| 16 | GND | 16 | GND | | |
| 17 | AUX CH(n) | 17 | AUX CH(n) | 7 | DDC DATA |
| 18 | Hot plug Detect | 18 | Hot plug Detect | 16 | HOT Plug Dect |
| 19 | Return | 19 | Return | | |
| 20 | DP PWR | 20 | DP PWR | 14 | DVI PWR |

As table 1-3 shows, the first plug 82c includes an ML_Lane0 positive pin, a first grounded pin, an ML_Lane0 negative pin, an ML_Lane1 positive pin, a second grounded pin, an ML_Lane1 negative pin, an ML_Lane2 positive pin, a third grounded pin, an ML_Lane2 negative pin, an ML_Lane3 positive pin, a fourth grounded pin, an ML_Lane3 negative pin, a config1 pin, a config2 pin, an AUX CH positive pin, a fifth grounded pin, an AUX CH negative pin, a hot-plug detect pin, a return pin, and a DP PWR pin. The second plug 84c of the converter member 80c includes a TMDS2+ pin, a first ground pin, a TMDS2− pin, a TMDS1+ pin, a second ground pin, a TMDS1− pin, a TMDS0+, a third ground pin, a TMDS0− pin, a TMDS clock+ pin, a fourth ground pin, a TMDS clock− pin, a DDC clock pin, a DDC data pin, a hot plug detect pin, and a DVI PWR pin. The TMDS2+ pin connects with the ML_Lane0 positive pin. The first ground pin connects with the first grounded pin. The TMDS2− pin connects with the ML_Lane0 negative pin. The TMDS1+ pin connects with the ML_Lane1 positive pin. The second ground pin connects with the second grounded pin. The TMDS1− pin connects with the ML_Lane0 negative pin. The TMDS0+ pin connects with the ML_Lane2 positive pin. The third ground pin connects with the third grounded pin. The TMDS0− pin connects with the ML_Lane2 negative pin. The TMDS clock+ pin connects with the ML_Lane3 positive pin. The fourth ground pin connects with the fourth grounded pin. The TMDS clock− pin connects with the ML_Lane3 negative pin. The DDC clock pin connects with the AUX CH(p) pin. The DDC data pin connects with the AUX CH(n) pin. The DVI PWR pin connects the DP PWR pin.

The first plug 82d of the converter member 80d is a DP type plug, and the second plug of the converter member 80c is a LAN type plug. Table 1-4 below shows the relationship between the pins of the first interface 10d and the pins of the first and second plugs 82d and 84d.

TABLE 1-4

| | First interface | | PIN | First plug | PIN | Second plug |
|---|---|---|---|---|---|---|
| PIN | Display_Port1.2 | | | Display_Port1.2 | | LAN |
| 1 | ML_Lane3(n) | | 1 | ML_Lane0(p) | 1 | Tranceive Data+ |
| 2 | GND | | 2 | GND | | |
| 3 | ML_Lane3(p) | | 3 | ML_Lane0(n) | 2 | Tranceive Data− |
| 4 | ML_Lane2(n) | | 4 | ML_Lane1(p) | 3 | Receive Data+ |
| 5 | GND | | 5 | GND | | |
| 6 | ML_Lane2(p) | | 6 | ML_Lane1(n) | 6 | Not connected |
| 7 | ML_Lane1(n) | | 7 | ML_Lane2(p) | 4 | Not connected |
| 8 | GND | | 8 | GND | 5 | Not connected |
| 9 | ML_Lane1(p) | | 9 | ML_Lane2(n) | 7 | Not connected |
| 10 | ML_Lane0(n) | | 10 | ML_Lane3(p) | 8 | Not connected |
| 11 | GND | | 11 | GND | | |
| 12 | ML_Lane0(p) | | 12 | ML_Lane3(n) | | |
| 13 | CONFIG1 | | 13 | CONFIG1 | | |
| 14 | CONFIG2 | | 14 | CONFIG2 | | |
| 15 | AUX CH(p) | | 15 | AUX CH(p) | | |
| 16 | GND | | 16 | GND | | |
| 17 | AUX CH(n) | | 17 | AUX CH(n) | | |
| 18 | Hot plug Detect | | 18 | Hot plug Detect | | |
| 19 | Return | | 19 | Return | | |
| 20 | DP PWR | | 20 | DP PWR | | |

As table 1-4 shows, the first plug 82c includes an ML_Lane0 positive pin, a first grounded pin, an ML_Lane0 negative pin, an ML_Lane1 positive pin, a second grounded pin, an ML_Lane1 negative pin, an ML_Lane2 positive pin, a third grounded pin, an ML_Lane2 negative pin, an ML_Lane3 positive pin, a fourth grounded pin, an ML_Lane3 negative pin, a config1 pin, a config2 pin, an AUX CH positive pin, a fifth grounded pin, an AUX CH negative pin, a hot-plug detect pin, a return pin, and a DP PWR pin. The second plug 84c of the converter member 80c includes a Transceive Data+ pin, a Transceive Data− pin, a Receive Data+ pin, and a Receive Data− pin. The Transceive Data+ pin connects with the ML_Lane0 positive pin. The Transceive Data− connects with the ML_Lane0 negative pin. The Receive Data+ pin connects with the ML_Lane1 positive pin. The Receive Data− pin connects with the ML_Lane1 negative pin.

In another embodiment, the first plug 82d of the converter member 80d is a DP type plug, and the second plug of the converter member 80c is a External Serial Advanced Technology Attachment (eSATA) type plug. Table 1-5 below shows the relationship between the pins of the first interface 10d and the pins of the first and second plugs 82d and 84d.

TABLE 1-5

| First interface | | | First plug | | Second plug | |
|---|---|---|---|---|---|---|
| PIN | Display_Port1.2 | | PIN | Display_Port1.2 | PIN | E-SATA |
| 1 | ML_Lane3(n) | | 1 | ML_Lane0(p) | 2 | DR+ |
| 2 | GND | | 2 | GND | 1 | GND |
| 3 | ML_Lane3(p) | | 3 | ML_Lane0(n) | 3 | DR- |
| 4 | ML_Lane2(n) | | 4 | ML_Lane1(p) | 5 | DT+ |
| 5 | GND | | 5 | GND | 4 | GND |
| 6 | ML_Lane2(p) | | 6 | ML_Lane1(n) | 6 | DT- |
| 7 | ML_Lane1(n) | | 7 | ML_Lane2(p) | | |
| 8 | GND | | 8 | GND | 7 | GND |
| 9 | ML_Lane1(p) | | 9 | ML_Lane2(n) | | |
| 10 | ML_Lane0(n) | | 10 | ML_Lane3(p) | | |
| 11 | GND | | 11 | GND | | |
| 12 | ML_Lane0(p) | | 12 | ML_Lane3(n) | | |
| 13 | CONFIG1 | | 13 | CONFIG1 | | |
| 14 | CONFIG2 | | 14 | CONFIG2 | | |
| 15 | AUX CH(p) | | 15 | AUX CH(p) | | |
| 16 | GND | | 16 | GND | | |
| 17 | AUX CH(n) | | 17 | AUX CH(n) | | |
| 18 | Hot plug Detect | | 18 | Hot plug Detect | | |
| 19 | Return | | 19 | Return | | |
| 20 | DP PWR | | 20 | DP PWR | | |

As the table 1-5 shows, the first plug 82d includes an ML_Lane0 positive pin, a first grounded pin, an ML_Lane0 negative pin, an ML_Lane1 positive pin, a second grounded pin, an ML_Lane1 negative pin, an ML_Lane2 positive pin, a third grounded pin, an ML_Lane2 negative pin, an ML_Lane3 positive pin, a fourth grounded pin, an ML_Lane3 negative pin, a config1 pin, a config2 pin, an AUX CH positive pin, a fifth grounded pin, an AUX CH negative pin, a hot-plug detect pin, a return pin, and a DP PWR pin. The second plug 84d of the converter member 80d includes a DR+ pin, a first ground pin, a DR- pin, a DT+ pin, a second ground pin, a DT- pin, and a third ground pin. The DR+ pin connects with the ML_Lane0 negative pin. The first ground pin connects with the first grounded pin. The DR- pin connects with the ML_Lane0 negative pin. The DT+ pin connects with the ML_Lane1 positive pin. The second ground pin connects with the second grounded pin. The DT- pin connects with the ML_Lane1 negative pin. The third ground pin connects with the third grounded pin.

In another embodiment, the first plug 82d of the converter member 80d is a DP type plug, and the second plug of the converter member 80c is a IEEE 1394 type plug. Table 1-6 below shows the relationship between the pins of the first interface 10d and the pins of the first and second plugs 82d and 84d.

TABLE 1-6

| First interface | | | First plug | | Second plug | |
|---|---|---|---|---|---|---|
| PIN | Display_Port1.2 | | PIN | Display_Port1.2 | PIN | IEEE 1394 |
| 1 | ML_Lane3(n) | | 1 | ML_Lane0(p) | 3 | TPB*5 1 |
| 2 | GND | | 2 | GND | 2 | VG Cable ground 2 |
| 3 | ML_Lane3(p) | | 3 | ML_Lane0(n) | 4 | TPB 62 |
| 4 | ML_Lane2(n) | | 4 | ML_Lane1(p) | 5 | TPA*33 |
| 5 | GND | | 5 | GND | | |
| 6 | ML_Lane2(p) | | 6 | ML_Lane1(n) | 6 | TPA 44 |
| 7 | ML_Lane1(n) | | 7 | ML_Lane2(p) | | |
| 8 | GND | | 8 | GND | | |
| 9 | ML_Lane1(p) | | 9 | ML_Lane2(n) | | |
| 10 | ML_Lane0(n) | | 10 | ML_Lane3(p) | | |
| 11 | GND | | 11 | GND | | |
| 12 | ML_Lane0(p) | | 12 | ML_Lane3(n) | | |
| 13 | CONFIG1 | | 13 | CONFIG1 | | |
| 14 | CONFIG2 | | 14 | CONFIG2 | | |
| 15 | AUX CH(p) | | 15 | AUX CH(p) | | |
| 16 | GND | | 16 | GND | | |
| 17 | AUX CH(n) | | 17 | AUX CH(n) | | |
| 18 | Hot plug Detect | | 18 | Hot plug Detect | | |
| 19 | Return | | 19 | Return | | |
| 20 | DP PWR | | 20 | DP PWR | 1 | VP Cable power 1 |

As the table 1-6 shows, the first plug 82d includes an ML_Lane0 positive pin, a first grounded pin, an ML_Lane0 negative pin, an ML_Lane1 positive pin, a second grounded pin, an ML_Lane1 negative pin, an ML_Lane2 positive pin, a third grounded pin, an ML_Lane2 negative pin, an ML_Lane3 positive pin, a fourth grounded pin, an ML_Lane3 negative pin, a config1 pin, a config2 pin, an AUX CH positive pin, a fifth grounded pin, an AUX CH negative pin, a hot-plug detect pin, a return pin, and a DP PWR pin. The second plug 84d of the converter member 80a includes a TPB*51 pin, a VG cable ground 2 pin, a TPB 62 pin, a TPA*33 pin, a TPA 44 pin, and a VP Cable power 1 pin. The TPB*51 pin connects with the ML_Lane0 negative pin. The VG cable ground 2 pin connects with the first grounded pin. The TPB 62 pin connects with the ML_Lane0 negative pin. The TPA*33 pin connects with the ML_Lane1 positive pin. The TPA 44 pin connects with the ML_Lane1 negative pin. The VP Cable power 1 pin connects with the DP PWR pin.

In at least embodiment, each of the converter member 80a-80n pre-stores a format code. The processor 10 pre-stores a table of the relationship between different voltages and formats codes of the converter members 80a-80n, and a plurality of processing units (not shown) for processing different format codes. The processor 10 obtains the format code stored in the convert member connected with the selected load media(s), and selects the corresponding processing unit(s) for converting the received signals into a specified format corresponding to the obtained format code. In at least one embodiment, the processor 10 obtains the format code through the AUX CH negative pins of the first interface and the first plug, and the AUX CH positive pins of the first interface and the first plug.

In another embodiment, the processor 10 further pre-store a table of the relationship between different voltages and data formats of the converter members 80a-80n, and a plurality of processing units (not shown) for processing different format codes. The processor 10 detects the voltage on the second resistor R2 in converter member 80 the corresponding to the selected load media(s), and selects the corresponding processing unit(s) for converting into a specified format based on the detected voltage.

For example, under the first working mode, the load media 900a is selected, the switch module 12 turns on to establish an electrical connection between the load media 900a and the first converter 15a. The signals outputted by the load media 900a is transmitted to the processor 10 by being passed through the converter member 80a connected to the load media 900a, and the first interface 10a. The processor 10 detects the voltage of the second resistor R2 in the converter member 80a, and selects the processing unit corresponding to the HDMI format for converting the HDMI signals into DP signals based on the detected voltage. Thus, the electronic device 100 displays the processed received signals from the selected load media 900a on the display module 16.

Under the second working mode, the load medias 900b-900c are selected, the switch module 12 turns on to establish an electrical connection between the load media 900b and the second converter 15b, and an electrical connection between the load media 900c and the third converter 15c. The signals outputted by the load media 900b is transmitted to the processor 10 by being passed through the converter member 80a connected to the load media 900b, and the first interface 10b. The processor 10 detects the voltage of the second resistor R2 in the converter member 80b, and selects the processing unit corresponding to the USB format for converting the USB signals in to DP signals based on the detected voltage. The signals outputted by the load media 900c is transmitted to the processor 10 by being passed through the converter member 80c connected to the load media 900c, and the first interface 10c. Thus, the first converter 15b transmits the received signals to the internal component 20b and the second converter 15c transmits the received signals to the internal component 20c. The processor 10 detects the voltage of the second resistor R2 in the converter member 80c, and selects the processing unit corresponding to the DVI format for converting the DVI signals into the DP signals based on the detected voltage. Thus, the electronic device 100 simultaneously display the processed received signals from the selected load medias 900b-900c on the display module 16.

In use, the signals transmitted form the load media(s) to the electronic device 100 is passed through the corresponding second plug and the corresponding first plug orderly, and the signals is converted in the electronic device 100. Thus, signal distortion transmitted between the selected media(s) and the electronic device is reduced.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including matters of shape, size, and arrangement of the parts within the principles of the present disclosure, up to and including the full extent established by the broad general meaning of the terms used in the claims.

What is claimed is:

1. A converter member capable of connecting between an electronic device and a load media for converting signals format, the converter member comprising:
   a first plug detachably connected to the electronic device; and
   a second plug detachably connected to the load media;
   wherein the first plug and the second plug are electronically connected with each other; the first plug and the second plug are two different type plugs; the signals from the load media is transmitted to the electronic device through the second plug and the first plug orderly, the electronic device converts format of the received signals; the second plug further stores a specified format code; the specified format code identifies the format of the signal outputted by the connected load media; the electronic device obtains the specified format code from the second plug, and coverts the received signals into a specified format based on the obtained specified format code.

2. The converter member of claim 1, wherein the electronic device comprises a first interface connected to the first plug; the first plug is a DP type plug, and the first plug comprises an ML_Lane0 positive pin, a first grounded pin, an ML_Lane0 negative pin, an ML_Lane1 positive pin, a second grounded pin, an ML_Lane1 negative pin, an ML_Lane2 positive pin, a third grounded pin, an ML_Lane2 negative pin, an ML_Lane3 positive pin, a fourth grounded pin, an ML_Lane3 negative pin, a config1 pin, a config2 pin, an AUX CH positive pin, a fifth grounded pin, an AUX CH negative pin, a hot-plug detect pin, a return pin, and a DP PWR pin; the electronic device obtains the format code through the AUX CH negative pin and the AUX CH positive pin of the first plug.

3. The converter member of claim 2, wherein the second plug is a High Definition Multimedia Interface (HDMI) type plug; the second plug comprises a TMDS2+ pin, a first ground pin, a TMDS2− pin, a TMDS1+ pin, a second ground pin, a TMDS1− pin, a TMDS0+, a third ground pin, a TMDS0− pin, a HRXCP pin, a fourth ground pin, a HRXCN pin, a CEC pin, a DDC/CEC pin, a SCL pin, a NC pin, a SDA pin, a hot plug detect pin, and a HDMI PWR pin; the TMDS2+ pin connects with the ML_Lane0 positive pin; the first ground pin connects with the first grounded pin; the TMDS2− pin connects with the ML_Lane0 negative pin; the TMDS1+ pin connects with the ML_Lane1 positive pin; the second ground pin connects with the second grounded pin; the TMDS1− pin connects with the ML_Lane0 negative pin; the TMDS0+ pin connects with the ML_Lane2 positive pin; the third ground pin connects with the third grounded pin; the TMDS0− pin connects with the ML_Lane2 negative pin; the HRXCN pin connects with the ML_Lane3 positive pin; the fourth ground pin connects with the fourth grounded pin; the HRXCP pin connects with the ML_Lane3 negative pin; the CEC pin connects with the config1 pin; the DDC/CEC pin connects with the config2 pin; the SCL pin connects with the AUX CH(p) pin; the NC pin connects with the fifth grounded pin; the SDA pin connects with the AUX CH(n) pin; the HDMI PWR pin connects the DP PWR pin.

4. The converter member of claim 2, wherein the second plug is a Universal Serial Bus (USB) type plug; the second plug comprises a D− pin, a D+ pin, a GND pin, an STDA_SSRX− pin, an STDA_SSRX+ pin, a GND_DRAIN pin, an STDA_SSTX− pin, an STDA_SSRX+ pin, and a VBUS pin; the D+ pin connects with the ML_Lane0 positive pin; the GND pin connects with the first grounded pin; the D− pin connects with the first ML_Lane0 negative pin; the STDA_SSRX+ pin connects with the ML_Lane1 positive pin; the GND_DRAIN pin connects with the second grounded pin; the STDA_SSRX− pin connects with the ML_Lane2 negative pin; the VP Cable power 1 pin connects with the DP PWR pin; the VBUS pin connects to the DP PWR.

5. The converter member of claim 2, wherein the second plug is a digital visual interface (DVI) type plug; the second plug comprises a TMDS2+ pin, a first ground pin, a TMDS2− pin, a TMDS1+ pin, a second ground pin, a TMDS1− pin, a TMDS0+, a third ground pin, a TMDS0− pin, a TMDS clock+ pin, a fourth ground pin, a TMDS clock− pin, a DDC clock pin, a DDC data pin, a hot plug detect pin, and a DVI PWR pin; the TMDS2+ pin connects with the ML_Lane0 positive pin; the first ground pin connects with the first grounded pin; the TMDS2− pin connects with the ML_Lane0 negative pin; the TMDS1+ pin connects with the ML_Lane1 positive pin; the second ground pin connects with the second grounded pin; the TMDS1− pin connects with the ML_Lane0 negative pin; the TMDS0+ pin connects with the ML_Lane2 positive pin; the third ground pin connects with the third grounded pin; the TMDS0− pin connects with the ML_Lane2 negative pin; the TMDS clock+ pin connects with the ML_Lane3 positive pin; the fourth ground pin connects with the fourth grounded pin; the TMDS clock− pin connects with the ML_Lane3 negative pin; the DDC clock pin connects with the AUX CH(p) pin; the DDC data pin connects with the AUX CH(n) pin; the DVI PWR pin connects the DP PWR pin.

6. The converter member of claim 2, wherein the second plug is a LAN type plug; the second plug comprises a Transceive Data+ pin, a Transceive Data− pin, a Receive Data+ pin, and a Receive Data-pin; the Transceive Data+ pin connects with the ML_Lane0 positive pin; the Transceive Data-connects with the ML_Lane0 negative pin; the Receive Data+ pin connects with the ML_Lane1 positive pin; the Receive Data− pin connects with the ML_Lane1 negative pin.

7. The converter member of claim 2, wherein the second plug is External Serial Advanced Technology Attachment (eSATA) type plug; the second plug comprises a DR+ pin, a first ground pin, a DR− pin, a DT+ pin, a second ground pin, a DT− pin, and a third ground pin; the DR+ pin connects with the ML_Lane0 negative pin; the first ground pin connects with the first grounded pin; the DR-pin connects with the ML_Lane0 negative pin; the DT+ pin connects with the ML_Lane1 positive pin; the second ground pin connects with the second grounded pin; the DT− pin connects with the ML_Lane1 negative pin; the third ground pin connects with the third grounded pin.

8. The converter member of claim 2, wherein the second plug is a IEEE 1394 type plug; the second plug comprises a TPB*51 pin, a VG cable ground 2 pin, a TPB 62 pin, a TPA*33 pin, a TPA 44 pin, and a VP Cable power 1 pin; the TPB*51 pin connects with the ML_Lane0 negative pin; the VG cable ground 2 pin connects with the first grounded pin; the TPB 62 pin connects with the ML_Lane0 negative pin; the TPA*33 pin connects with the ML_Lane1 positive pin; the TPA 44 pin connects with the ML_Lane1 negative pin; the VP Cable power 1 pin connects with the DP PWR pin.

9. A converter member capable of connecting between an electronic device and a load media for converting signals format, the converter member comprising:
a first plug detachably connected to the electronic device; and
a second plug detachably connected to the load media;
wherein the first plug and the second plug are electronically connected with each other; the first plug and the second plug are two different type plugs; the signals from the load media is transmitted to the electronic device through the second plug and the first plug orderly, the electronic device converts format of the received signals; the converter further comprises a first resistor; the electronic device comprises a power supply, a second resistor, and a processor; the power supply is connected to processor though the second resistor; an end of the first resistor is connected to the second resistor, and the other end of the resistor is grounded; the electronic device further stores a table of the relationship between different voltages and format codes; the processor detects the voltage divided on the first resistor, the detected voltage indicates the format of the second plug; the processor further converts the received signals into a specified format corresponding to the detected voltage in the table.

10. The converter member of claim 9, wherein the electronic device comprises a first interface connected to the first plug; the first plug is a DP type plug, and the first plug comprises an ML_Lane0 positive pin, a first grounded pin, an ML_Lane0 negative pin, an ML_Lane1 positive pin, a second grounded pin, an ML_Lane1 negative pin, an ML_Lane2 positive pin, a third grounded pin, an ML_Lane2 negative pin, an ML_Lane3 positive pin, a fourth grounded pin, an ML_Lane3 negative pin, a config1 pin, a config2 pin, an AUX CH positive pin, a fifth grounded pin, an AUX CH negative pin, a hot-plug detect pin, a return pin, and a DP PWR pin; the electronic device obtains the format code through the AUX CH negative pin and the AUX CH positive pin of the first plug.

11. The converter member of claim 10, wherein the second plug is a High Definition Multimedia Interface (HDMI) type plug; the second plug comprises a TMDS2+ pin, a first ground pin, a TMDS2− pin, a TMDS1+ pin, a second ground pin, a TMDS1− pin, a TMDS0+, a third ground pin, a TMDS0− pin, a HRXCP pin, a fourth ground pin, a HRXCN pin, a CEC pin, a DDC/CEC pin, a SCL pin, a NC pin, a SDA pin, a hot plug detect pin, and a HDMI PWR pin; the TMDS2+ pin connects with the ML_Lane0 positive pin; the first ground pin connects with the first grounded pin; the TMDS2− pin connects with the ML_Lane0 negative pin; the TMDS1+ pin connects with the ML_Lane1 positive pin; the second ground pin connects with the second grounded pin; the TMDS1-pin connects with the ML_Lane0 negative pin; the TMDS0+ pin connects with the ML_Lane2 positive pin; the third ground pin connects with the third grounded pin; the TMDS0− pin connects with the ML_Lane2 negative pin; the HRXCN pin connects with the ML_Lane3 positive pin; the fourth ground pin connects with the fourth grounded pin; the HRXCP pin connects with the ML_Lane3 negative pin; the CEC pin connects with the config1 pin; the DDC/CEC pin connects with the config2 pin;

the SCL pin connects with the AUX CH(p) pin; the NC pin connects with the fifth grounded pin; the SDA pin connects with the AUX CH(n) pin; the HDMI PWR pin connects the DP PWR pin.

12. The converter member of claim 10, wherein the second plug is a Universal Serial Bus (USB) type plug; the second plug comprises a D− pin, a D+ pin, a GND pin, an STDA_SSRX− pin, an STDA_SSRX+ pin, a GND_DRAIN pin, an STDA_SSTX− pin, an STDA_SSRX+ pin, and a VBUS pin; the D+ pin connects with the ML_Lane0 positive pin; the GND pin connects with the first grounded pin; the D− pin connects with the first ML_Lane0 negative pin; the STDA_SSRX+ pin connects with the ML_Lane1 positive pin; the GND_DRAIN pin connects with the second grounded pin; the STDA_SSRX− pin connects with the ML_Lane2 negative pin; the VP Cable power 1 pin connects with the DP PWR pin; the VBUS pin connects to the DP PWR.

13. The converter member of claim 10, wherein the second plug is a digital visual interface (DVI) type plug; the second plug comprises a TMDS2+ pin, a first ground pin, a TMDS2− pin, a TMDS1+ pin, a second ground pin, a TMDS1− pin, a TMDS0+, a third ground pin, a TMDS0− pin, a TMDS clock+ pin, a fourth ground pin, a TMDS clock− pin, a DDC clock pin, a DDC data pin, a hot plug detect pin, and a DVI PWR pin; the TMDS2+ pin connects with the ML_Lane0 positive pin; the first ground pin connects with the first grounded pin; the TMDS2− pin connects with the ML_Lane0 negative pin; the TMDS1+ pin connects with the ML_Lane1 positive pin; the second ground pin connects with the second grounded pin; the TMDS1− pin connects with the ML_Lane0 negative pin; the TMDS0+ pin connects with the ML_Lane2 positive pin; the third ground pin connects with the third grounded pin; the TMDS0− pin connects with the ML_Lane2 negative pin; the TMDS clock+ pin connects with the ML_Lane3 positive pin; the fourth ground pin connects with the fourth grounded pin; the TMDS clock− pin connects with the ML_Lane3 negative pin; the DDC clock pin connects with the AUX CH(p) pin; the DDC data pin connects with the AUX CH(n) pin; the DVI PWR pin connects the DP PWR pin.

14. The converter member of claim 10, wherein the second plug is a LAN type plug; the second plug comprises a Transceive Data+ pin, a Transceive Data− pin, a Receive Data+ pin, and a Receive Data− pin; the Transceive Data+ pin connects with the ML_Lane0 positive pin; the Transceive Data− connects with the ML_Lane0 negative pin; the Receive Data+ pin connects with the ML_Lane1 positive pin; the Receive Data− pin connects with the ML_Lane1 negative pin.

15. The converter member of claim 10, wherein the second plug is External Serial Advanced Technology Attachment (eSATA) type plug; the second plug comprises a DR+ pin, a first ground pin, a DR− pin, a DT+ pin, a second ground pin, a DT− pin, and a third ground pin; the DR+ pin connects with the ML_Lane0 negative pin; the first ground pin connects with the first grounded pin; the DR-pin connects with the ML_Lane0 negative pin; the DT+ pin connects with the ML_Lane1 positive pin; the second ground pin connects with the second grounded pin; the DT− pin connects with the ML_Lane1 negative pin; the third ground pin connects with the third grounded pin.

16. The converter member of claim 10, wherein the second plug is a IEEE 1394 type plug; the second plug comprises a TPB*51 pin, a VG cable ground 2 pin, a TPB 62 pin, a TPA*33 pin, a TPA 44 pin, and a VP Cable power 1 pin; the TPB*51 pin connects with the ML_Lane0 negative pin; the VG cable ground 2 pin connects with the first grounded pin; the TPB 62 pin connects with the ML_Lane0 negative pin; the TPA*33 pin connects with the ML_Lane1 positive pin; the TPA 44 pin connects with the ML_Lane1 negative pin; the VP Cable power 1 pin connects with the DP PWR pin.

* * * * *